United States Patent
Nepela

Patent Number: 5,961,746
Date of Patent: *Oct. 5, 1999

[54] CORROSION RESISTANT AMORPHOUS MAGNETIC ALLOYS

[75] Inventor: Daniel A. Nepela, San Jose, Calif.

[73] Assignee: Read-Rite Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/912,222

[22] Filed: Aug. 15, 1997

Related U.S. Application Data

[63] Continuation-in-part of application No. 08/635,609, Apr. 22, 1996, abandoned.

[51] Int. Cl.[6] ............................................. H01F 1/147
[52] U.S. Cl. ............................................. 148/304; 148/403
[58] Field of Search ....................................... 148/304, 403

[56] References Cited

U.S. PATENT DOCUMENTS

| | | | |
|---|---|---|---|
| 3,856,513 | 12/1974 | Chen et al. | 148/403 |
| 4,416,709 | 11/1983 | Ohya et al. | 148/403 |
| 4,482,400 | 11/1984 | O'Handley | 148/403 |
| 4,668,310 | 5/1987 | Kudo et al. | 148/403 |
| 5,151,137 | 9/1992 | Yoshizawa et al. | 148/304 |
| 5,376,191 | 12/1994 | Roman et al. | 148/403 |

OTHER PUBLICATIONS

Merriman, A. D., A Dictionary of Matallurgy, p. 399, 1958.

*Primary Examiner*—John Sheehan
*Attorney, Agent, or Firm*—Nathan N. Kallman

[57] ABSTRACT

The magnetic metal composition of a Co-based alloy includes additives to produce an amorphous condition in the alloy and also includes amounts of Rh to increase the corrosion resistance of the alloy. By adding the amorphous-producing materials and selected amounts of Rh, the corrosion resistance of the resulting Co-based alloys has been found to be considerably improved over that of the base amorphous Co alloy without rhodium.

5 Claims, 1 Drawing Sheet

CORROSION RESISTANT AMORPHOUS MAGNETIC ALLOYS

CROSS-REFERENCE TO RELATED APPLICATION

This application is a continuation-in-part application Ser. No. 08/635,609, filed Apr. 22, 1996 now abandoned.

Copending application Ser. No. 08/114, 629, filed Sep. 2, 1993, and owned by the same assignee as the present application, discloses a soft magnetic alloy of NiFe with amounts of Rh therein for corrosion rate recuction.

FIELD OF THE INVENTION

This invention relates to amorphous magnetic alloy compositions having improved corrosion resistance.

DESCRIPTION OF THE PRIOR ART

There has been extensive activity over the years in the field of corrosion prevention in magnetic materials. One area of particular interest is in the fabrication of magnetic transducers or heads for use in magnetic recording devices such as magnetic disk drives, magnetic tape devices and the like. Current versions of such transducers usually incorporate one or more layers and shapes of thin film material which are formed by deposition, etching or milling, or by a combination of these steps, in the fabrication of the finished devices. After fabrication, the devices are exposed to a variety of corrosive environments during use, and unless this corrosive action is prevented, or at least reduced, serious problems may arise over time with the performance of the transducers.

One possible approach to corrosion resistance or prevention is to coat the exposed surface of the device with a layer of protective material to effectively seal the device elements from the corrosive atmosphere. However, in the case of the magnetic transducers discussed herein, this approach is not practical because the magnetic reading and writing components of the transducers must be positioned as close as possible to the magnetic record medium from which the signals are to be reproduced and on which they are to be written or recorded in order to achieve maximum recording and reproduction density. Thus, the presence of a corrosion protection layer between the transducer components and the record medium would reduce the available recording density.

Other efforts at corrosion resistance or prevention have involved the addition of one or more different materials to the thin film material, or have involved the use of different steps during the manufacture of the transducer. However, none of these techniques have proved to be totally satisfactory to date.

U.S. Pat. No. 4,023,695 (Suits) describes NiFe magnetic thin film alloys having Rh added thereto for corrosion resistance. Suits does not teach the use of Co-based alloys.

U.S. Pat. 4,615,748 (Takino et al) describes amorphous soft magnetic thin films of alloys of Co and Hf and Pd with a saturation magnetic induction Bs approaching 15,000 gauss and a saturation magnetostriction constant $\lambda s$ less than $1.5 \times 10^{-6}$.

U.S. Pat. 4,668,310 (Kudo et al) describes amorphous magnetic alloys including magnetic metals and metalloid alloys including Zr, Ti and Y.

A publication entitled Magnetic Properties And Corrosion Resistance Of (CoFeB) 100-x Cr x Thin Films, Journal of Applied Physics, 50 (11), November 1979, page 7603, Brunsch, describes tests to determine the effects of varying amounts of Cr in CoFeB alloys on the corrosion rate of the alloys. This paper concluded that a strong increase of the corrosion rate was observed in the alloys when the Cr amount ranged between 4 and 15 At %, and at lower Cr concentrations no significant reduction in corrosion rate of the base alloy was observed.

Another publication, Magnetic Corrosion and Surface Properties of NiFeCr Thin Films, Journal of Applied Physics, Vol 47, No. 3, March 1976, page 1158, Rice et al, describes the effect of Cr additions to Permalloy in the form of 82 atomic percent (At %) Ni and 18 At % Fe. The additions of Cr to Permalloy and its observed effect on the corrosion rate set out in this publication are summarized herein as FIG. 1 of the prior art.

A further paper entitled Properties of Thin Permalloy Films with Rhodium Addition For Corrosion Resistance, Journal of Applied Physics, Vol 50(a) September 1979, page 5899, Rice et al, describes the effects of Rh additions to Permalloy on the corrosion resistance of such alloys. The results of this paper are summarized and shown as prior art in FIG. 2 herein.

SUMMARY OF THE PRESENT INVENTION

One of the principal discoveries involved in this invention is that both relative corrosion resistance and magnetostriction changes may be estimated for various elements added to a Co-based amorphous alloy system. The objective is to simultaneously achieve a magnetostriction value of $\lambda s$ $<1 \times 10^{-6}$ and a relative corrosion resistance which is equal to or greater than that of 80:20 NiFe (Permalloy).

For typical Co-based amorphous alloys, i.e., alloys that contain from 70-96 At % Co and up to approximately 6 At % Fe, with the remainder of the amorphous composition of the prior art being composed of an element selected from the group. Zr, Ta, Nb, Hf, Ti and B, the corrosion rate of such alloys is generally about 6 times greater than that of Permalloy, i.e. 81:19 At % NiFe, in typical corrosive environments.

For these general amorphous Co-based alloys such as Co from 70-96 At %, the base corrosion rate of such an alloy relative to that of Permalloy is identified as the base rate= (corrosion rate of amorphous Co alloy/corrosion rate of Permalloy). The base corrosion rate of an alloy of the present invention which is Co90 At %, Zr4.5 At % and Rh5.5 At %, if made without the addition of Rh, is approximately 6 times that of Permalloy. With the addition of Rh at 5.5 At % in accordance with this invention, the corrosion rate observed is $6 \times 10^{-xAt \% Rh}$, where x is found to be 0.065, yielding a corrosion rate that is approximately 2.7 times that of Permalloy.

From the prior art findings which are illustrated in Table III herein and in FIGS. 1 and 2 herein and which show the effect of both Rh and Cr additives on Permalloy (a crystalline material), it would be expected that both Cr and Rh would be effective in reducing the corrosion rate of amorphous Co alloys as well. However, the use of Cr additives with amorphous Co alloys as shown in the prior art produces at best no change in the corrosion rate, and in fact indicates somewhat of an increase in the corrosion rate of such alloys. Thus, x for Cr in such systems is essentially equal to zero, i.e., no effect on corrosion rate. In contrast, the present invention shows that the addition of Rh to such amorphous Co-based alloys is unexpectedly effective in decreasing the corrosion rate of Co-based amorphous alloys.

In thin metal films, the amorphous state is produced largely as a function of atom size, the general rule being that the larger the atom diameter, the less the amount of that atom that is required to create an amorphous condition in an alloy. For example, the diameter of an atom of Ti is 2.88 Å and it requires a minimum of 15 At % of Ti to render an alloy of CoTi amorphous; the diameter of an atom of Zr is 3.17 Å and it requires a minimum of 3-4 At % of Zr to produce an amorphous condition in an alloy of CoZr.

The preferred elements to render Co amorphous are Zr, Ta, Y, Mg and Nb, or other rare earth metals, since these minimize the loss of moment due to the relatively low concentrations required to produce an amorphous condition in Co which has an atomic % in the range of 85.5% to 89.5%, i.e. approximately 2.5–4.5 At % for Zr and approximately 8–10 At % for Ta and Nb. In combinations of Zr Zr and/or Ta or Nb, the amorphous condition is achieved when the At % is at 7–9 At % of the combined elements. For alloys wherein the amorphous condition is achieved by the addition of either Zr alone or in combination with Ta or Nb, the magnetostriction can be controlled in accordance with this invention.

DESCRIPTION OF THE PREFERRED EMBODIMENT

Figure 1:
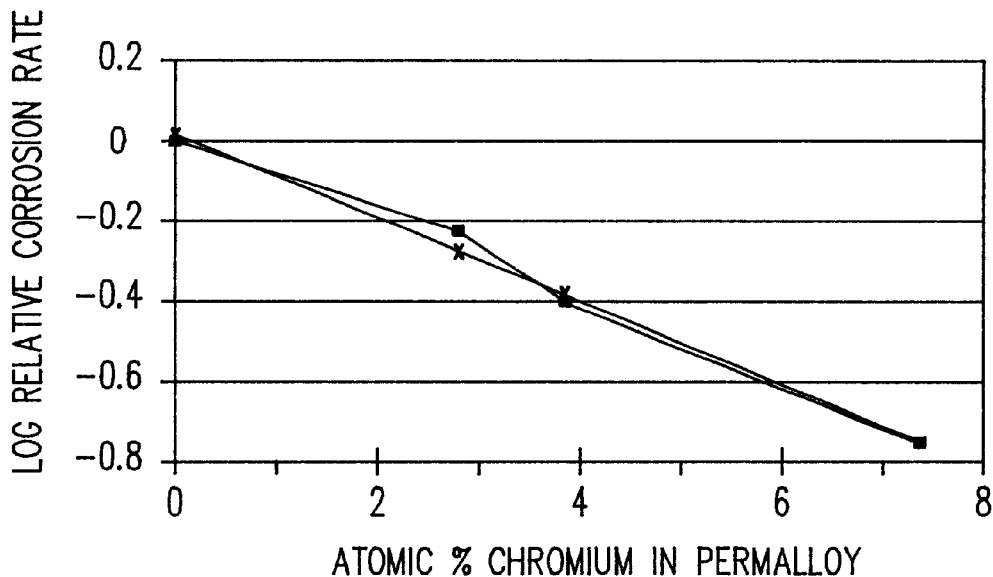
FIG. 1 is a graph of variations in corrosion resistance as a function of the atomic percent of Cr in Permalloy, an 80% Ni 20% Fe alloy, as shown in the prior art.
Figure 2:
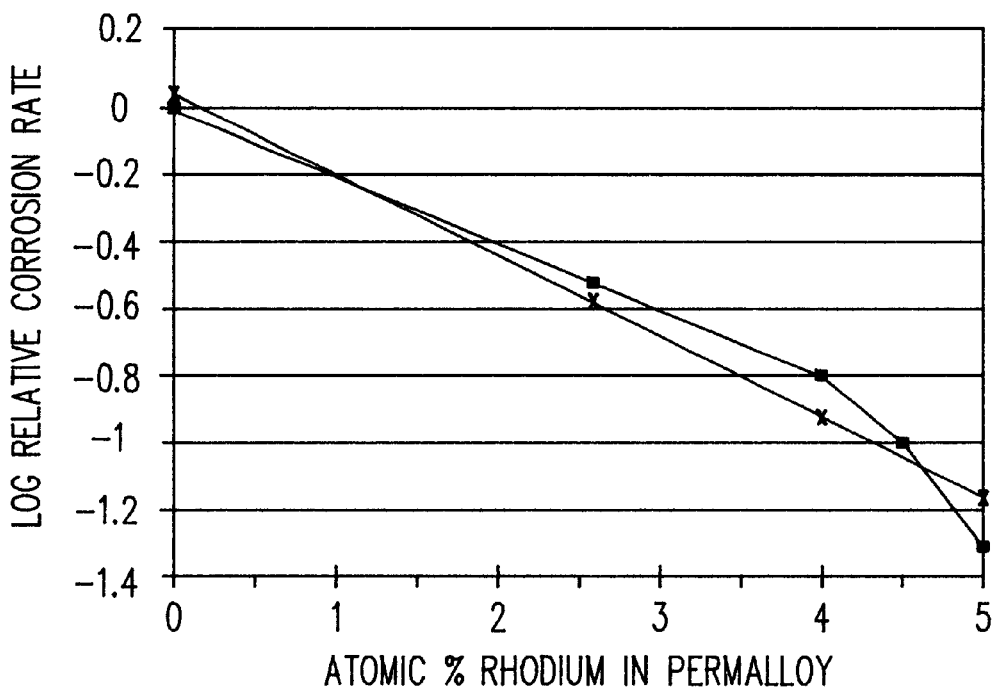
FIG. 2 is a graph of variations in corrosion resistance as a function of the atomic percent of Rh in Permalloy, as shown in the prior art.

In alloys which are rendered amorphous by Zr, Ta, Nb, Ti, Y or rare earth elements, or combinations thereof, and which achieve a λs of approximately $1\times10^{-6}$, the following estimated changes in saturation magnetostriction λ occur for the listed added elements. Thus, compensation of λs for complex alloys, e.g. quaternary and pentanary alloys, can be estimated. These are shown below in Table I.

TABLE I

| Added elements | Δλs/Atomic % for Concentrations ≦10% |
|---|---|
| Fe | ~ +0.9 × 10$^{-6}$ |
| Ti | ~ +0.26 × 10$^{-6}$ |
| Cr, Mo, W | ~ +0.2 × 10$^{-6}$ |
| Rh | ~ -0.04 × 10$^{-6}$ |
| Ni, Au | ~ -0.12 × 10$^{-6}$ |
| Pt, Pd | ~ -0.22 × 10$^{-6}$ |
| Mn | ~ +0.5 10$^{-6}$ |
| Cu | ~ +0.10 10$^{-6}$ |
| Ru | ~ +0.08 10$^{-6}$ |
| Ir | ~ -0.20 10$^{-6}$ |

Table II below lists the approximate dilutive effect on the magnetic moment of a Co alloy by the addition of different amounts of amorphous metals and combinations of metals. Table II is calculated using a saturation magnetic induction 4πMs for Co of 17.5 kilogauss, and subtracting therefrom the dilutive 4πMs for the atomic weight percent of the particular element or elements added to the alloy.

TABLE II

DILUTION EFFECT OF VARIOUS ELEMENTS ON
4πMs OF COBALT, 4πMs (o) = 17.5 KG

| Added Element | Δ 4πMs/Atomic % |
|---|---|
| Fe | ≈ +211G/At % |
| Cr | ≈ -711G/At % |
| W, Mo | ≈ -603G/At % |
| Zr, Hf, Ti | ≈ -480/At % |
| Pt, Ni, Au, Pd | ≈ -192G/At % |
| Ti | ≈ -470G/At % |
| Rh | ≈ -241G/At % |
| Y & Rare Earth Elements | ≈ -330G/At % |
| Mg | ≈ -200G/At % |

EXAMPLE 1

Below is a specific example of an alloy whose corrosion rate is 0.8 that of Permalloy and which has a 4πMs of approximately 14.3KG and a $\lambda s \leq 1\times10^{-6}$.

Co81.5 Fe3.5 (Pt,Pd)9 Zr 4 Rh2, $\lambda s^{\pm 1\times 10^{-6}}$

The range of atomic percentages for the elements of this alloy composition are 70–90% cobalt, 2–15% rhodium, 2–15% zirconium and 3–20% platinum or palladium wherein the selected atomic percentages of the elements of the alloy do not total more than 100%.

Referring to the values in Table II, the value of 4πMs for this alloy can be calculated as follows:

$$4\pi Ms=17,500(Co)+740(Fe)-1,728(PtPd)-1,312(Zr)-482(Rh)=14:3 \text{ KG}$$

Examples of ternary, quaternary and pentanary alloy systems capable of excellent corrosion resistance and λs of approximately $1\times10^{-6}$ or less are set out below. It is apparent that even more complex systems may be considered utilizing the teachings of this invention.

EXAMPLE 2

An alloy of Co90 Zr4.5 Rh5.5 was prepared and tested. The measured properties of this alloy were found to be

| | |
|---|---|
| 4πMs | = 15,000 Gauss |
| Magnetostriction λs | = 4 × 10$^{-8}$ |
| Hc | = 0.08 oersteds |
| Hk (with magnetic field annealing at 235° C.) | = 5 oersteds |
| Permeability | = 3,000 |

The corrosion resistance of this amorphous alloy is 0.44 that of 81:19 NiFe (Permalloy).

The Zr concentration can be varied by+1–1.5 At % greater than illustrated in Examples 1 and 2 and still maintain low magnetostriction and improved corrosion resistance. For a selected atomic % of cobalt in the range of 70–96%, a 2–20% atomic % of Rh and 2–15% atomic % of zircon can be added to the composition, provided that the total of the atomic percentages is 100%. In both Examples 1 and 2, 4πMs is greater than 12,000 Gauss.

As previously indicated, the Brunsch paper reports that the addition of Cr to an amorphous Co-based alloy of Co79 Fe6.5 B14.5, with Cr addition of up to ~14At %, results in no decrease in corrosion rate. Thus, the relationship between Cr and Rh additions to Permalloy is unexpected for amorphous Co-based alloys, as shown in Table III below.

TABLE III

| Element Added | Alloy | Effect on Corrosion |
|---|---|---|
| Cr | NiFe | decrease in corrosion rate |
| Rh | NiFe | decrease in corrosion rate |
| Cr | Co-based | no effect at low concentrations; increase in rate at higher concentrations |

Thus, the effect of Rh on the corrosion rate in Co-based amorphous alloys is an unexpected and beneficial result.

What is claimed is:

1. An amorphous magnetic metal alloy for forming thin film magnetic heads having high corrosion resistance consisting essentially of Ta Tb Tc where Ta includes a atomic % of Co;

Tb includes b atomic % of Rh; and

Tc includes c atomic % of Zr, said alloy being characterized by $70 \leq a \leq 90$ $2 \leq b \leq 20$ $2 \leq c \leq 15$ wherein the total atomic % of the elements Co, Rh and Zr of said alloy total 100%, and said magnetic metal alloy has a saturation magnetic induction Bs of at least 12,000 Gauss, and a saturation magnetostriction constant λs no greater than $1.0 \times 10_{-6}$.

2. A magnetic alloy in accordance with claim 1 whose corrosion resistance is at least equal to that of an alloy of 80:20 NiFe.

3. An amrphous magnetic metal alloy for forming thing film magnetic heads having high corrosion resistance consisting essentially of Ta Tb Tc Td where Ta indicates a the atomic % of Co;

Tb indicates b atomic % Rh;

Tc indicates c atomic % of Zr;

Td indicates d atomic % of at least one of Pt, or Pd;

said alloy being characterizied by $70 \leq a \leq 90$ $2 \leq b \leq 15$ $2 \leq c \leq 15$ $3 \leq d \leq 20$ wherein the total atomic % of the elements Co, Rh, Zr, Pt and/or Pd of said alloy total 100%, and said magnetic metal alloy has a saturation magnetic induction Bs of at least 12,000 Gauss, and a saturation magnetostriction constant λs no greater than $1.0 \times 10_{-6}$.

4. A magnetic alloy in accordance with claim 3 whose corrosion resistance is at least equal to that of an alloy of 80:20 NiFe.

5. An amorphous magnetic metal alloy having high corrosion resistance said alloy consisting essentially of Ta Tb Tc where Ta includes 90 atomic % of Co;

Tb includes 5.5 atomic % of Rh; and

Tc includes 4.5 atomic % of Zr so that the magnetostriction is $4 \times 10^{-8}$ and the corrosion rate is 0.44 that of 81:19 NiFe;

wherein the total atomic % of the elements of Co. Rh and Zr total 100%.

* * * * *